No. 871,921. PATENTED NOV. 26, 1907.
J. F. FISH.
NUT LOCK.
APPLICATION FILED JULY 23, 1906.
Fig. 1.
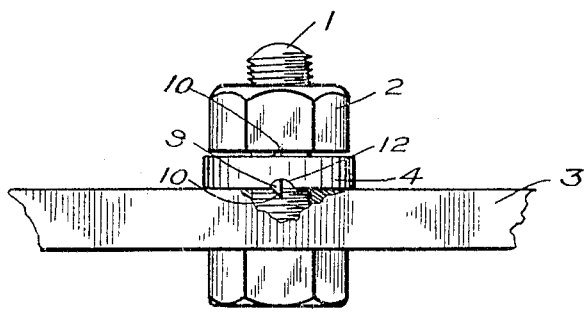
Fig. 2.
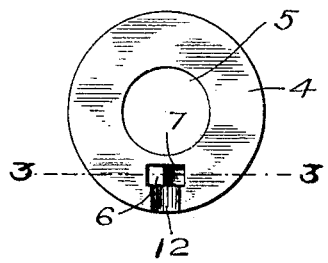
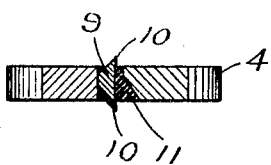
Fig. 3.
Fig. 6.
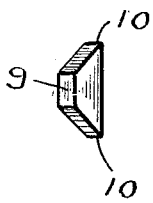
Fig. 4.
Fig. 5.
Witnesses
Charles Parker
C. H. Greesbauer
Inventor
Joseph F. Fish.
by H. B. Willson & Co.
Attorneys

UNITED STATES PATENT OFFICE.

JOSEPH F. FISH, OF CHICAGO, ILLINOIS, ASSIGNOR OF ONE-HALF TO E. B. REITH, OF CHICAGO, ILLINOIS.

NUT-LOCK.

No. 871,921.      Specification of Letters Patent.      Patented Nov. 26, 1907.

Application filed July 23, 1906. Serial No. 327,420.

*To all whom it may concern:*

Be it known that I, JOSEPH F. FISH, a citizen of the United States, residing at Chicago, in the county of Cook and State of Illinois, have invented certain new and useful Improvements in Nut-Locks; and I do declare the following to be a full, clear, and exact description of the invention, such as will enable others skilled in the art to which it appertains to make and use the same.

My invention has relation to nut locks, and it consists in the construction and arrangement of parts, as will be hereinafter described and particularly pointed out in the claim.

Figure 1 is a side elevation of a nut lock constructed in accordance with my invention and applied to the structure to be held, the structure being partly in section. Fig. 2 is a bottom plan view of the locking washer; Fig. 3 is a sectional view on the line 3—3 of Fig. 2; Fig. 4 is a perspective view of the pawl, Fig. 5 is a similar view of the resilient filler member and Fig. 6 is a side view of the washer showing the pawl detached from the recess.

Referring to the accompanying drawing for a more particular description of my invention, the numeral 1 designates an ordinary bolt and 2 is a nut of usual construction adapted to be screwed upon said bolt. Between the nut 2 and the device 3 to which the bolt and nut are secured is a washer 4, said washer having a plain hole 5 adapted to surround the bolt and to permit the latter to move freely therein.

A recess 6 is formed transversely through the washer 4 with one side wall straight and the other side wall angular as represented at 7—8. Disposed within the recess is a pawl 9 having parallel sides "chisel-shaped" at the ends as at 10, and bearing against the straight wall of the recess by one of its parallel sides so that the ends project for engagement both with the adjacent face of the nut 2 and of the body 3.

A filler member 11 having one side straight and one side inclined is inserted within the recess 6 with the straight side bearing against the adjacent side of the pawl and the inclined side bearing against the inclined side of the recess and holding the pawl yieldably in position.

A channel 12 is formed in one wall of the washer and communicates with the recess through which the pawl extends. The purpose of this channel is to permit the pawl to be moved by inserting a suitable implement for the purpose of disengaging the pawl from the nut for removing the latter whenever it is found desirable to do so.

As shown in Fig. 1, it will be seen that one chisel-shaped end of the pawl engages the device to which the nut and bolt are to be secured and the other chisel-shaped end of the pawl engages the inner face of the nut, hence the nut is prevented from turning upon the bolt, as will be understood.

Various changes in the form, proportion and the minor details of construction may be resorted to without departing from the principle or sacrificing any of the advantages of this invention.

Having thus described my invention, what I claim as new and desire to secure by Letters-Patent, is;—

A nut lock comprising a bolt with an object, a washer and a nut thereon, the washer having a transverse recess provided on one side with a straight wall and on its opposite side with an angular wall, a pawl having opposite straight sides and also oppositely inclined sides, said inclined sides having their terminals sharpened, the pawl serving to be mounted in the recess to permit of one of its flat sides to contact with the straight wall of the recess and its sharpened terminals projecting forwardly and rearwardly therefrom, a resilient member constructed to conform to the shape of the recess and serving to be mounted therein, so as to contact with the inner straight wall of the pawl and also with the angular wall of the recess, the terminal sharpened ends of the pawl serving to impinge against said object and said nut, and said washer having an opening in its side which communicates with the recess to permit of the insertion of an implement to disengage said pawl substantially as specified.

In testimony whereof I have hereunto set my hand in presence of two subscribing witnesses.

JOSEPH F. FISH.

Witnesses:
     GEO. G. SEEGAR,
     EMIL B. REITH.